(No Model.)
S. T. JENKINS & T. J. McGUIRE.
PACKING BOX FOR TRANSPORTING RIPE FRUIT.
No. 346,162. Patented July 27, 1886.
FIG. I.
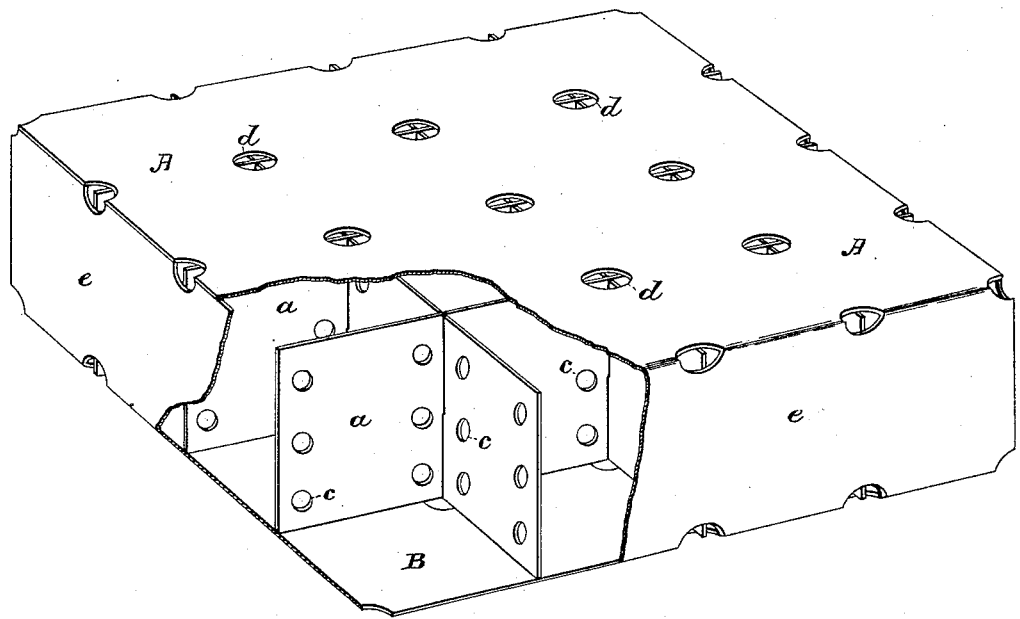
FIG. II.
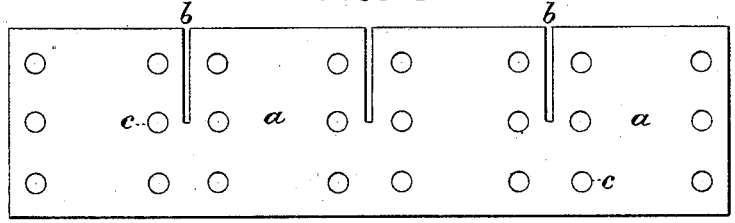
Attest:
Geo. T. Smallwood.
Philip Mauro
Inventors:
Simeon T. Jenkins &
Thomas J. McGuire
by A. Pollok their attorney.

UNITED STATES PATENT OFFICE.

SIMEON T. JENKINS AND THOMAS J. McGUIRE, OF BALTIMORE, MARYLAND.

PACKING-BOX FOR TRANSPORTING RIPE FRUIT.

SPECIFICATION forming part of Letters Patent No. 346,162, dated July 27, 1886.

Application filed May 10, 1886. Serial No. 201,718. (No model.)

*To all whom it may concern:*

Be it known that we, SIMEON T. JENKINS and THOMAS J. McGUIRE, both of Baltimore, Maryland, have invented a new and useful Improvement in Packing-Boxes or Carriers for Transporting Ripe Fruit, which improvement is fully set forth in the following specification.

This invention has reference to the construction of packing boxes or cases for ripe fruit—such as peaches, pears, oranges, and the like—during transportation; and its object is to produce boxes or cases in which such fruit may be safely carried long distances without deterioration, which shall be simple in construction and cheap, and which can be folded up and packed in small compass.

The present invention comprises certain improvements upon the box described in patent of Simeon T. Jenkins, No. 318,937, dated May 26, 1885. As therein described, the box consists, essentially, of a series of intersecting partitions or strips of straw-board or like material, interlocking by means of partial cross-cuts. The edges of the strips are notched at the points of intersection, forming openings at each corner of each cell, and the horizontal partitions are perforated at points coincident with the intersections of the partitions, so as to form numerous air-passages throughout the box, or throughout a series of such boxes packed together in a crate.

The present invention is designed to increase the ventilation and circulation of air; and to this end the partitions have a line of perforations punched therein along and adjacent to the lines of intersection.

The sheets forming the top and bottom, respectively, of the box are perforated, as before, at points coincident with the intersections, so that each perforation communicates with four cells or cubes, and the said sheets are formed with flaps, one on each end, to be turned up or down to form the sides of the box. The flaps of the top sheet thus form two opposite sides of the box, the remaining sides being formed by the flaps of the bottom sheet.

The accompanying drawings, which form a part of this specification, illustrate a fruit box or carrier constructed in accordance with the invention.

Figure I is a perspective view with a portion of the top and of two sides broken away to show the interior, and Fig. II a view of one of the partition-strips.

The series of cubes or cells for reception of the fruit are formed by strips $a$, of straw-board or other suitable material, and are interlocked by means of cross-cuts $b$, in the usual manner, so that the whole series can be folded up. The strips $a$ are provided with a series of perforations, $c$, by means of a suitable die or punch, forming a line of perforations on each side of each cross-cut $b$. The sheets from which the top A and bottom B are formed are perforated at equidistant points, the distance from center to center of each perforation $d$ being equal to that between the cuts $b$ of the partition-strips, so that when the parts are assembled together an air-passage is formed at each of the eight corners of each cell. The parts A B are identical in construction, each having a flap or turn-over part, $e$, at opposite ends. The flaps $e$ are equal to the depth of the box, and the four flaps, when turned over, close the four sides of the box, two sides being in one piece with the part A and two with the part B.

In forming the parts A and B the blank is cut on lines bisecting rows of perforations, and the flaps or sides $e$ are folded on lines bisecting rows of perforations. This facilitates folding, and also insures that when the parts are assembled the semicircular holes on the edges of one strip will register with corresponding holes on the edges of the other.

The safe preservation of fruit during transportation, especially if the distance be great, depends upon the continual change of the surrounding air. The numerous perforations in the walls of the cells, as herein shown and described, promote the circulation of air and insure the uniform diffusion and distribution of fresh air as well throughout the interior cells as through those on the outside of the series. Of course when the boxes are packed one on top of another in a crate it will be necessary to use only one horizontal partition between two boxes, the bottom of one box serving as the top of the one beneath.

We claim—

The combination, with the series of cells formed by perforated intersecting and interlocking strips, of the perforated top provided with flaps on opposite ends, to form two sides of the box, and the perforated bottom arranged transversely to the top, and having end flaps to close the other two sides, substantially as described.

In testimony whereof we have signed this specification in the presence of two subscribing witnesses.

S. T. JENKINS.
T. J. McGUIRE.

Witnesses:
PHILIP MAURO,
C. J. HEDRICK.